United States Patent [19]
Shawen

[11] 3,984,049
[45] Oct. 5, 1976

[54] READ-WRITE HEAD BACK-UP MEMBER

[75] Inventor: Harley J. Shawen, Waterloo, Canada

[73] Assignee: NCR Canada Ltd. — NCR Canada Ltee, Mississauga, Canada

[22] Filed: Apr. 4, 1975

[21] Appl. No.: 565,190

[52] U.S. Cl. .......................... 235/61.11 D; 360/130
[51] Int. Cl.² .................... G06K 7/08; G11B 15/60
[58] Field of Search ............. 235/61.11 R, 61.11 D; 360/130, 2; 340/146.3

[56] References Cited
UNITED STATES PATENTS

| | | | |
|---|---|---|---|
| 2,644,690 | 7/1953 | Krag | 360/130 |
| 3,648,941 | 3/1972 | Merry | 360/130 |

Primary Examiner—Daryl W. Cook
Attorney, Agent, or Firm—J. T. Cavender; Wilbert Hawk, Jr.; George J. Muckenthaler

[57] ABSTRACT

A back-up member is provided wherein a single bracket supports an elongated member at several points therealong, one face of the elongated member serving as a flat surface for a plurality of resilient pads which are positioned to be formed in a curved manner by a spring member which is adjacent slant-edged portions of the bracket and secured at the several points thereof. The spring member thereby presents a pair of surfaces for applying pressure on record media to maintain such media in close proximity to associated read and write heads.

4 Claims, 5 Drawing Figures

U.S. Patent  Oct. 5, 1976  3,984,049
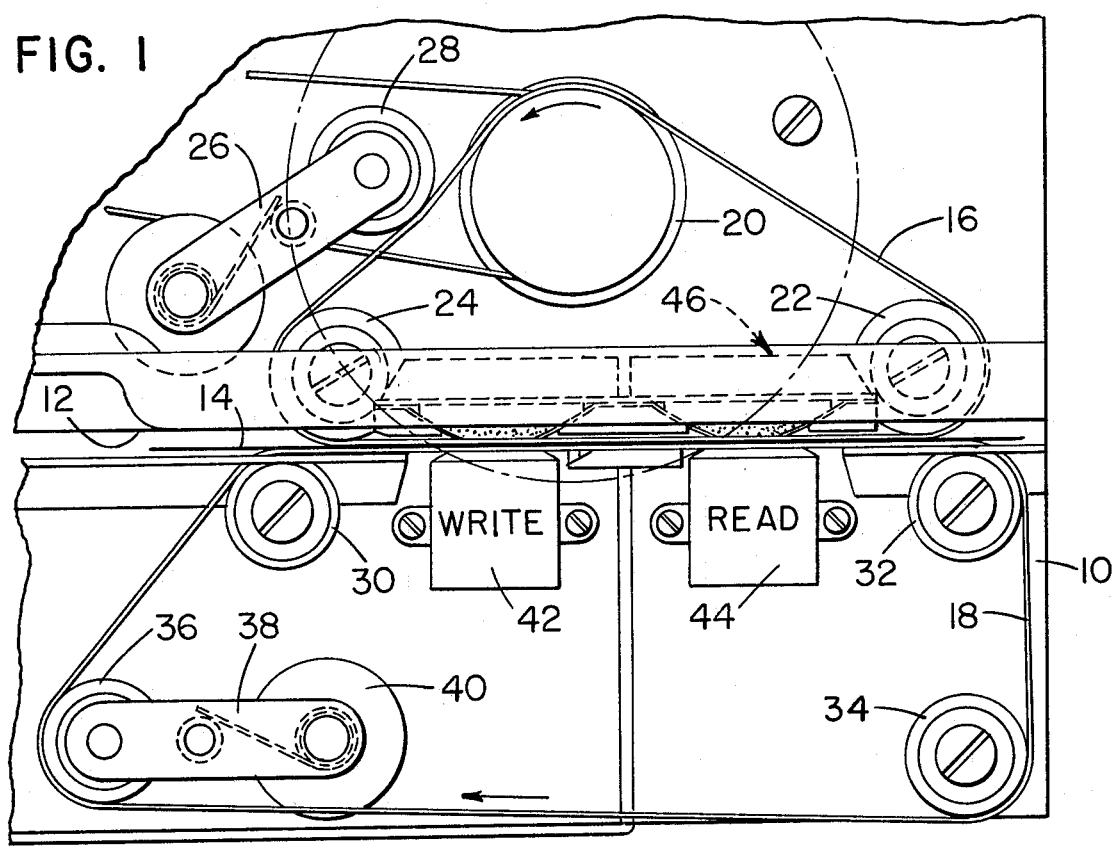
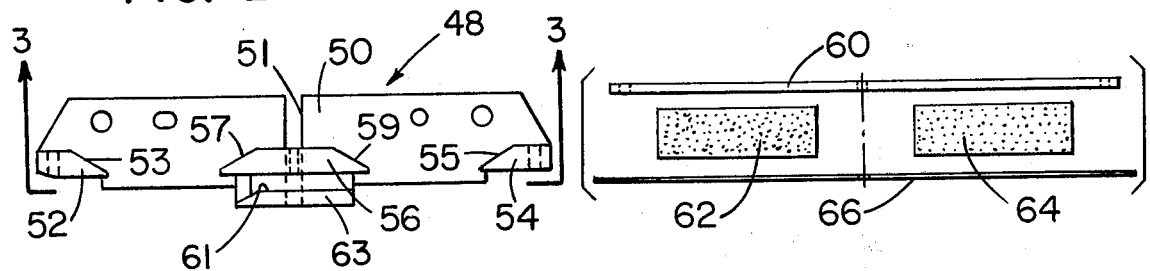

READ-WRITE HEAD BACK-UP MEMBER

BACKGROUND OF THE INVENTION

In the area of writing on media and reading therefrom by means of magnetic ink characters, one of the important aspects of the several operations is to provide method and apparatus for maintaining the media in a position in relation to the write and/or read heads so as to obtain a clear and precise working operation, while at the same time permitting a free flow path for the media past the heads. The media may be in any one of several forms including tapes or webs, documents and cards or the like, such media having space provided thereon for receiving information in one manner or another to be retained for later reading thereof. In the case of tape or web-like media, it is presently the state of the art to provide the information or characters in magnetic ink on the tape or web by magnetic charges deposited thereon for reading the desired information at a later time. It has also been a practice to provide on documents, such as checks or the like, characters in magnetic code for identification purposes during the processing operation, the most common application being that of sorting bank checks in high speed operations. In the manner of processing these checks, a number of them are deposited in a bin or hopper and then are selected in individual manner to be transported along a path where the checks may be further processed to add additional information thereto or to read certain information from the checks to be used in the further processing thereof.

Since the several operations are performed at the highest velocities practicable, it is essential that the documents are transported in a free flowing manner while the addition of or the reading of certain information is accurate and clear in processing the data. Therefore, the positioning of the document in relation to the read and/or write heads must be necessarily precise so as not to miss any information during the processing operation.

Representative of prior art, in the manner of positioning media in data processing apparatus, is British Pat. No. 1,110,141 which discloses a tape transport mechanism with a record-playback head and an erase head, and wherein a pair of pressure pads cooperate with the heads, the pads being mounted on a plate slidably mounted on the tape deck, and the plate being guided by a pair of lugs. The tape is biased against the heads by a spring which is connected between the plate and the deck. Frederick U.S. Pat. No. 3,109,924 shows record handling and reading apparatus having magnetizing and reading heads, and a spring-loaded flexible non-conductive band bearing against the surface of a drum carrying the reading head to bring the back surface of the document into close proximity with the head. Nettleton et al. U.S. Pat. No. 3,393,277 discloses a tape transport with independently operable drive and brake means at record and reproduce stations with a felt pressure pad, loaded by a U-shaped spring, to urge the tape against the respective heads. Hammond U.S. Pat. No. 3,402,868 shows a tape drive arrangement for a pair of transducer heads with springs urging pressure rollers against the peripheral surface of the drive capstan. Orzechowski U.S. Pat. No. 3,629,556 discloses card reading mechanism with a plastic pressure pad supported on a spring arm to urge the pad toward a transducer having a curved face. Bach U.S. Pat. No. 3,648,023 discloses a reading and/or writing device for record carriers in card form wherein a spring urges against a fence having a magnetic head thereon. Von Glahn et al. U.S. Pat. No. 3,801,804 discloses a drum driven document back-up roller having a pair of read heads and spring loaded back-up holding means to bias a document against the surface of the heads. And, Shore U.S. Pat. No. 3,822,835 shows a tape cartridge having a pair of foam backing pads adjacent the transducer openings and held in place by two pairs of pins for each pad.

SUMMARY OF THE INVENTION

The present invention relates to document transport apparatus and more particularly to method and apparatus for providing support or back-up means for documents to enable positioning thereof in close proximity with associated processing equipment. The support or back-up member comprises a single bracket having a plurality of upstanding portions formed thereon and aligned to receive an elongated member to be secured thereto. A flat leaf-like spring engages with one side of each of a pair of foam elements disposed between the upstanding portions of the bracket, the placing of the spring, in the securing of the elongated member to such portions, deforming the foam elements in a curved manner to provide a pair of curved spring surfaces for engagement with passing documents to position them in close proximity with the read and/or write heads.

The invention covers method and apparatus for providing a precise path and position for the documents during the flow thereof past the transducers or heads so that the documents are correctly processed by the equipment. In the method of providing such path and positioning for the documents, the first step includes the placing of the leaf spring against the surface of the several upstanding portions of the bracket. The pair of foam elements are then positioned against the leaf spring in the open areas between the upstanding portions, and the elongated member is then secured to the upstanding portions, the securing thereof deforming edge portions of the foam elements in an arrangement which curves the leaf spring along slant-edged surfaces of the bracket and into the open areas to provide a pair of rounded surfaces for engagement by and with the documents as they are transported past the transducing station to maintain said documents in precise position in relation to the station for processing of the documents.

In view of the above discussion, the principal object of the present invention is to provide method and apparatus for maintaining close proximity of documents in relation to processing equipment.

Another object of the present invention is to provide improved means for positioning documents during the flow thereof past the transducing station.

An additional object of the present invention is to provide a single bracket type back-up member for applying pressure in the character area of documents to maintain such area in close proximity with read and write heads.

A further object of the present invention is to provide a pair of curved surfaces in precise position in relation to the flow of transported documents to maintain such documents in the desired register position.

Additional advantages and features of the present invention will become apparent and fully understood from a reading of the following description taken together with the annexed drawing, in which:

FIG. 1 is a top plan view of a portion of a business machine incorporating the subject matter of the present invention;

FIG. 2 is a top plan view of the single bracket used in the present invention;

FIG. 3 is a front view of the bracket taken on the line 3—3 of FIG. 2;

FIG. 4 is an exploded view of several parts showing the arrangement thereof prior to assembly of the apparatus; and FIG. 5 is a top plan view of the assembly.

Referring now to FIG. 1, there is shown a plan view of a portion of a business machine 10 wherein a check, document or like media is being transported past a processing station for the purpose of performing an operation such as writing or printing certain information on the check, or for reading certain information from the check. The machine 10 is provided with a passageway 12 along which the check 14 is made to travel by means of belts 16 and 18 past the station, the belts being driven in the The of the arrows by appropriate means such as, for example, the belt 16 by a drive pulley 20 and then trained around pulleys 22 and 24, and being tensioned by means of a spring-loaded arm 26 having a pulley 28 engageable with the belt 16. Belt 18 may be in direct contact with belt 16 to be driven thereby, or it may have drive means separate and like drive means 20, the belt 18 being trained around pulleys 30, 32, 34 and 36 and tensioned by a spring-loaded arm 38 connected with pulley 36 and an idler pulley 40. The write head 42 and the read head 44 are secured to the machine frame and are positioned on one side of and adjacent the passageway 12 so as to be in close proximity to the traveling check 14 to perform the desired operation, it, of course, being a requirement of the process to write or read the information with both speed and clarity.

In order that each passing check 14 is maintained in such close proximity to the read and write heads 44, 42, a back-up member or device 46 is provided directly across the passageway 12 from the heads, such back-up member being supported and positioned between pulleys 22 and 24 and incorporating certain elements to provide for contacting the check 14 as it passes along the heads 42 and 44. The member 46 includes a bracket 48, shown as a unit in plan view in FIG. 2 and in a frontal view in FIG. 3, the bracket 48 having an elongated base 50 with a kerf 51 at the center thereof for placement retaining, the bracket including upright end portions 52 and 54, and a central portion 56, such portions having slanted edges or surfaces such as edge 53 on portion 52, edge 55 on portion 54, and edges 57 and 59 on portion 56 for purposes to be described.

In FIG. 4 is shown an exploded view of several parts, in addition to the bracket 48, which make up the assembly of the present invention. A flat, rectangular shaped plate member 60 is provided and to which is secured, by means of adhesive or the like, a pair of foam members 62 and 64 which are compressible and of spring-like material to be deformed by a flat leaf spring 66. The spring 66, the foam members 62, 64, and the plate member 60 are positioned above the elongated base 50, (FIG. 3) with the spring and the plate member spanning the upright portions 52, 54 and 56. A passageway 61, (FIG. 2) for the traveling checks 14 is also provided by the bracket 48 wherein an upright portion 63 is secured to the base 50 and separated therefrom, such portion 63 being shown cutaway in FIG. 3. The portions 52 and 63 have slanted surfaces (FIG. 2) and the base 50 has an incline (FIG. 3) for better guiding a check through the passageway 61 and past the processing station.

The assembly of the various parts is illustrated in FIG. 5 in plan view wherein the bracket 48 is held in place and with the upstanding portions 52, 54 and 56 in position to receive first the leaf spring 66, and then the plate member 60 with the foam members 62 and 64 secured thereto, the plate member 60 and the spring 66 being secured to the upstanding portions 52, 54 and 56 by screws 68, 70 and 72. The leaf spring 66 is formed in a curved manner by the edge or surface 53 on portion 52, the edge 55 on portion 54, and the edges 57 and 59 on central portion 56. The foam members 62 and 64 are therefore compressed at the edges thereof by the spring 66 in being formed along the slanted edges of the upstanding portions, thereby leaving the curved or apex portions 74 and 76 in contact with the check or media 14 to urge the check into and maintain the position of the check in close proximity to the read and write heads 44 and 42, respectively. The entire assembly is then secured to the machine frame in the desired position, although there may be the common elongated slots in the bracket base 50 to permit adjustment of the assembly. While an adhesive is convenient for fixing the foam elements 62, 64 to the plate 60, the assembly can be made by standing the parts on the base 50 and securing the spring 66 and the plate 60 to the bracket portions 52, 54, 56.

It is thus seen that herein shown and described is an assembly for use in maintaining the position of documents or like media in relation to an operating station. The assembly enables the accomplishment of the objects and advantages mentioned above, and while only one embodiment of the invention has been disclosed herein, certain variations thereof may occur to those skilled in the art. It is contemplated that all such variations, not departing from the spirit and scope of the invention hereof, are to be construed in accordance with the following claims.

What is claimed is:

1. A method of maintaining a document proximal an operating station comprising the steps of:

providing a back-up member having spaced deformable members associated therewith, providing a spring element to fit against said deformable members, providing a bracket member having a plurality of upstanding portions including a central portion with slant-edged surfaces on said portions, and moving the back-up member and the spring element, with the deformable members therebetween, against the slant-edged surfaces of said upstanding portions and securing thereto so as to cause the spring element to bear against the slant-edged surfaces and thereby form the deformable member in curved manner to engage said spring element with the document.

2. A method of making an assembly for maintaining a document in close proximity to an operating station comprising the steps of:

providing a spring element, providing a back-up member with spaced compressible members affixed thereon, providing a bracket member having a plurality of upstanding portions including a central portion with slant-edged surfaces thereon, and moving the back-up member against the spring member and against the upstanding portions, the spring member bearing against the slant-edged surfaces and thereby deforming the compressible members between the back-up member and the spring element so as to form a plurality of curved portions in the spring member for engaging with the document.

3. A method of making back-up means for a document traveling past a processing station comprising the steps of:
providing a bracket member having a plurality of apertured upstanding portions and a central portion with slant-edged surfaces thereon,
providing a spring element for spanning said upstanding portions and said central portion,
providing a plate member having resilient means affixed thereto and positioned between said bracket member and said spring element, and securing said spring element and said plate member to said bracket member, the spring element bearing against said slant-edged surfaces and said resilient means forming a plurality of curved portions in said spring element for engagement with said document.

4. An article of manufacture comprising a plate member, a plurality of spaced deformable members associated with said plate member, a spring element proximal said deformable members, a bracket member having slant-edged side portions and a slant-edged central portion thereon for separating said deformable members and for receiving said spring element, and means for securing said spring element and said plate member, with said deformable members therebetween, to said bracket member to cause said spring member to bear against the slant-edged portions and compress the deformable members to form a plurality of curved portions of said spring element on a plane beyond the slant-edged portions.

* * * * *